United States Patent
Yoshida

(10) Patent No.: US 8,148,837 B2
(45) Date of Patent: Apr. 3, 2012

(54) OFFSHORE WIND TURBINE

(75) Inventor: Shigeo Yoshida, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/926,254

(22) Filed: Nov. 4, 2010

(65) Prior Publication Data
US 2011/0140445 A1    Jun. 16, 2011

(30) Foreign Application Priority Data

Dec. 11, 2009   (JP) .................................. 2009-281143

(51) Int. Cl.
*F03D 9/00*    (2006.01)
*H02P 9/04*    (2006.01)
(52) U.S. Cl. ........................................ 290/44; 290/55
(58) Field of Classification Search .............. 290/44, 290/55; 415/2.1, 4.1, 4.2, 4.5, 176, 178, 415/913; 416/132 B
See application file for complete search history.

(56) References Cited

U.S. PATENT DOCUMENTS

| | | | | |
|---|---|---|---|---|
| 3,752,395 A * | 8/1973 | Ashikian | ........................ | 237/46 |
| 6,676,122 B1 | 1/2004 | Wobben | | |
| 7,168,251 B1 * | 1/2007 | Janssen | ........................ | 60/641.1 |
| 7,637,715 B2 * | 12/2009 | Battisti | ........................ | 415/115 |
| 7,837,126 B2 * | 11/2010 | Gao | ........................... | 236/44 C |
| 7,905,104 B2 * | 3/2011 | Matesanz Gil et al. | ...... | 62/259.1 |
| 8,047,774 B2 * | 11/2011 | Bagepalli | ..................... | 415/176 |
| 8,053,918 B2 * | 11/2011 | Wobben | ......................... | 290/55 |
| 8,058,742 B2 * | 11/2011 | Erdman et al. | ................. | 290/55 |
| 2005/0167989 A1 * | 8/2005 | Kruger-Gotzmann et al. | . | 290/55 |
| 2010/0308596 A1 * | 12/2010 | Gawrisch et al. | .............. | 290/55 |
| 2011/0280707 A1 * | 11/2011 | Iskrenovic | ..................... | 415/4.2 |

FOREIGN PATENT DOCUMENTS

JP    2003-504562 A    2/2003

* cited by examiner

*Primary Examiner* — Julio Gonzalez
(74) *Attorney, Agent, or Firm* — McGinn IP Law Group, PLLC

(57) ABSTRACT

An offshore wind turbine is comprised of a tower structure body configured with a tower and foundation, a rotor supported at the tower top, a power generator generating electricity by the rotation of the rotor, and a power converter converting electricity from the generator. A cavity is formed in the tower and foundation, and an internal space configured therewith is divided into upper and lower chambers by a bulkhead with first and second air vents between or in either of the tower and foundation. The converter is disposed in the upper chamber. An air circulating channel and air blower (e.g., air exhaust fan) are provided wherein air is circulated from the converter to the lower chamber through the first air vent, then to the converter through the second air vent. An air inlet is disposed at a lower level of an air outlet, or a partition member is provided therebetween.

4 Claims, 2 Drawing Sheets

OFFSHORE WIND TURBINE

CROSS REFERENCES TO RELATED APPLICATIONS

The present application claims priority from Japanese Patent Application No. 2009-281143 filed on Dec. 11, 2009, the entire contents of which are hereby incorporated by reference.

BACKGROUND OF THE INVENTION

1. Field of the Invention

The present invention relates to offshore wind turbines, and more particularly to a cooling technology for a power converter.

2. Description of the Related Art

As is well known, wind turbines that are designed to be installed offshore for wind power generation have been under development. Such offshore wind turbines include a fixed-bottom offshore wind turbine the base end of which is fixed to the seabed and a floating offshore wind turbine which is supported in a floating state on the ocean by buoyancy of a floating body provided at a base end of the turbine.

For cooling a power generator in a nacelle and a rectifier and a transformer provided at the bottom of a tower, a wind turbine described in Japanese Unexamined Patent Application Publication (Translation of PCT Application) No. 2003-504562 (hereunder referred to as "Patent Document 1") employs a cooling system wherein the tower has a double-wall structure, and a circulating cooling channel is formed between an outer wall and an inner wall that connects the inside of the nacelle and the bottom of the tower. Air circulating in the cooling channel absorbs heat from the power generator, rectifier and transformer and dissipates the heat by heat exchange with ambient air through the outer wall.

The cooling system in the wind turbine described in Patent Document 1 is supposed to be effective on the ocean, but is not a technology specific to the offshore wind turbine. In addition, although air circulating in the tower is used, the cooling principle is based on heat exchange with ambient air and not on water cooling.

SUMMARY OF THE INVENTION

The present invention is made in view of the above conventional art, and it is an object of the present invention to provide a floating offshore wind turbine that is capable of closed water cooling with air circulating in the tower.

In order to solve the above-described problems, a floating offshore wind turbine according to a first aspect of the present invention is comprised of a tower structure body that is configured with a tower and a foundation thereof, a rotor that is supported at the top of the tower, a power generator that generates electric power by the rotation of the rotor, and a power converter that converts electric power output from the power generator. A cavity is formed in the tower and the foundation, and an internal space configured with the cavity in the tower and the foundation is divided into an upper chamber and a lower chamber by a bulkhead between the tower and foundation, or in the tower or foundation. The power converter is disposed in the upper chamber. A first air vent and a second air vent are formed at the bulkhead. An air circulating channel and an air blower are provided wherein air is circulated from the power converter to the lower chamber through the first air vent, then from the lower chamber to the power converter through the second air vent.

A second aspect of the present invention is the floating offshore wind turbine according to the first aspect wherein an air intake duct is provided to aspirate air from the lower chamber and channel the air to the second air vent, and an air inlet of the air intake duct that opens in the lower chamber is disposed below an air outlet to the lower chamber in the air circulating channel.

A third aspect of the present invention is the floating offshore wind turbine according to the first aspect wherein a partition member is provided in the lower chamber, the partition member which separates between the air outlet to the lower chamber in the air circulating channel and the air inlet from the lower chamber and bypasses air flow from the air outlet to the air inlet to below the air outlet and inlet.

A fourth aspect of the present invention is the floating offshore wind turbine according to any of the first to third aspects wherein a duct is provided that channels exhaust air from the power converter to the lower chamber through the first air vent.

Note that the foundation is fixed to the seabed or floats.

According to the present invention, the internal space of the tower structure body configured with the cavity in the tower and the foundation is divided into the upper chamber and the lower chamber by the bulkhead between the tower and foundation or in the tower or foundation, the power converter is disposed in the upper chamber, the first and second air vents are formed at the bulkhead, and the air circulation channel and air blower wherein air is circulated from the power converter to the lower chamber through the first air vent, then from the lower chamber to the power converter through the second air vent are provided. Accordingly, the power converter can be closed water cooled using air circulating in the tower structure body by channeling heat-absorbing air from the power converter to the lower chamber, heat-dissipating and cooling the air by heat exchange through the outer wall mainly with water outside of the lower chamber, and circulating the cooled air in the power converter. Therefore, it is preferable to dispose the whole or a lower part of the lower chamber under the water surface.

DESCRIPTION OF THE PREFERRED EMBODIMENTS

Embodiments of the present invention will hereunder be described with reference to the drawings. They are an embodiment of the present invention and do not limit the present invention in any way.

First Embodiment

Firstly, the first embodiment of the present invention will be described with reference to FIG. 1.

Figure 1:
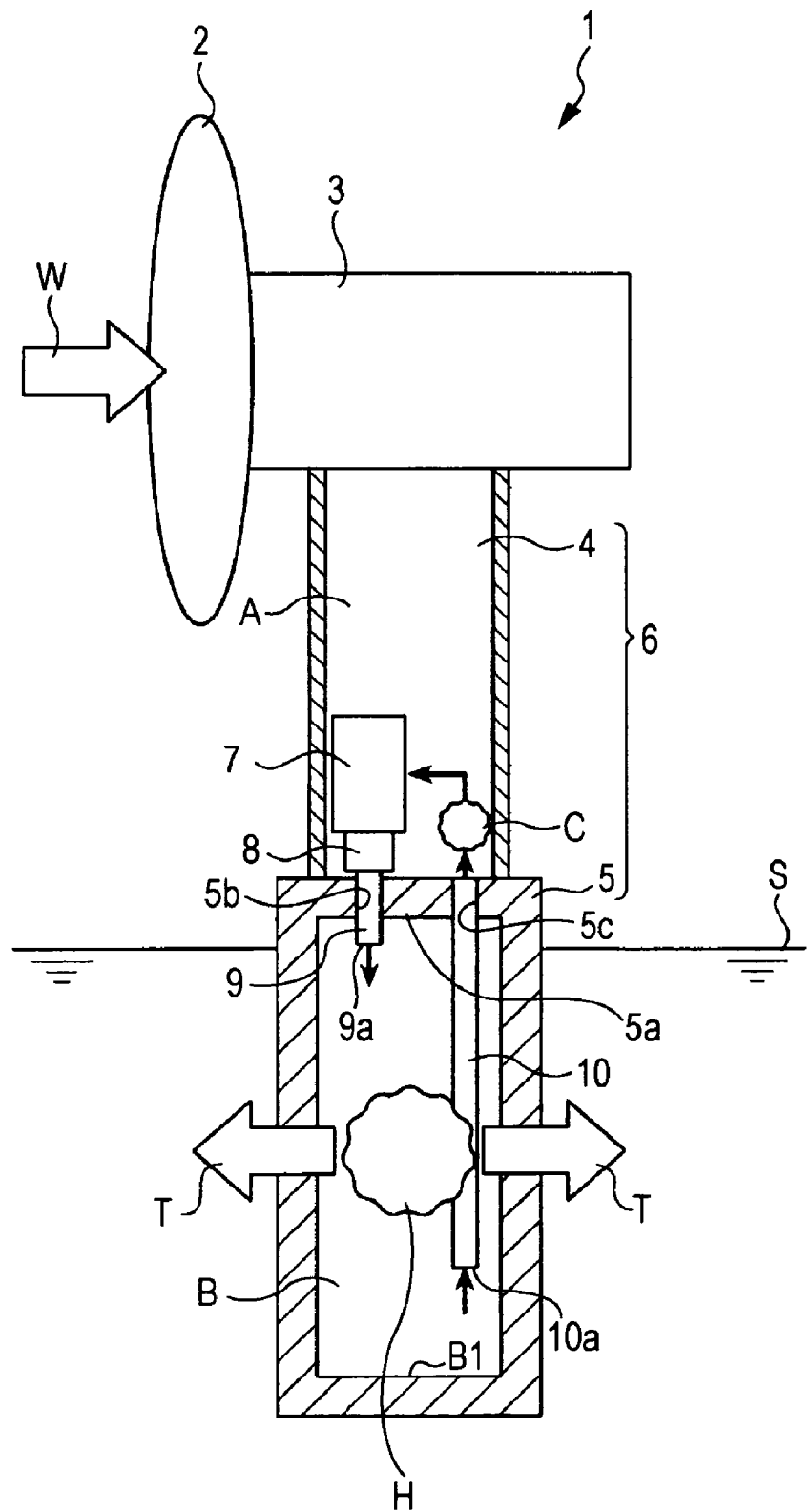
FIG. 1 is a partial schematic perspective side view of an offshore wind turbine according to a first embodiment of the present invention.

As shown in FIG. 1, an offshore wind turbine 1 according to the first embodiment is composed of a wind turbine rotor 2, a nacelle 3, a tower structure body 6 that is configured with a tower 4 and a foundation thereof 5, a power converter 7, an air exhaust fan 8, an air exhaust duct 9 and an air intake duct 10.

The nacelle 3 is supported at the top of the tower 4 so as to rotate freely horizontally. The rotor 2 is supported by the nacelle 3 so as to rotate freely. A main axis of the rotor 2 is supported by the nacelle 3 so as to rotate freely, and the main axis of the rotor 2 is connected to a speed-up gear and a power generator. The speed-up gear and power generator are disposed in the nacelle 3.

When the rotor 2 receives wind W and rotates, the power generator is rotated through the speed-up gear and electric power is generated. The power converter 7 converts output from the power generator to electric power of a predetermined voltage and frequency. The power converter corresponds to an inverter and a transformer.

A cavity is formed in the tower 4 and the foundation 5. The foundation 5 is fixed to the seabed or floats, and, in any case, a sealed cavity is formed such that water and air is blocked. An upper part of the foundation 5 in positioned above a water surface S while a lower part of the foundation 5 is immersed under the water surface S.

The tower 4 is arranged in a standing manner on the foundation 5. A lower end of the tower 4 is bonded to an upper end of the foundation 5 with no gap such that water and air is prevented from entering to the tower 4. An upper end of the tower 4 is connected to the nacelle 3 through a bearing that allows the nacelle 3 to rotate freely.

In this embodiment, an internal space of the tower structure body 6 configured with a cavity in the tower 4 and the foundation 5 is divided into an upper chamber A and a lower chamber B by a bulkhead 5a between the tower 4 and foundation 5, the bulkhead which is an upper end wall of the foundation 5. Accordingly, the cavity in the tower 4 directly corresponds to the upper chamber A and the cavity in the foundation 5 directly corresponds to the lower chamber B.

Alternatively, the cavity in the tower 4 and the foundation 5 may be connected and the bulkhead dividing the cavity into the upper and lower chambers may be arranged in the tower 4 or the foundation 5.

The power converter 7 is disposed in a lower part of the upper chamber A. In consideration of efficiency of maintenance work, it is preferable to dispose the power converter 7 above the water surface. In this embodiment, the upper end wall 5a of the foundation 5 and an upper part of the lower chamber B are disposed above the water surface.

A first air vent 5b and a second air vent 5c are formed at the bulkhead 5a. In the above structure, an air circulating channel and an air blower are configured wherein air is circulated from the power converter 7 to the lower chamber B through the first air vent 5b, then from the lower chamber B to the power converter 7 through the second air vent 5c.

In this embodiment, therefore, the air exhaust fan 8 that exhausts air in the power converter 7 is attached along the power converter 7 as the air blower. It will be apparent to those skilled in the art that the air blower may be disposed on any part of the air circulating channel. It will be also apparent to those skilled in the art that an additional air blower such as an air intake fan attached along the air intake duct 10 may be provided in addition to the air exhaust fan 8.

The air exhaust duct 9 is inserted to the first air vent 5b. An upper end of the air exhaust duct 9 is connected to the air exhaust fan 8 and a lower end of the air exhaust duct 9 opens in the lower chamber B. Accordingly, the air exhaust duct 9 channels exhaust air from the power converter 7 to the lower chamber B through the first air vent 5b. The lower-end opening of the air exhaust duct 9 which opens in the lower chamber B functions as an air outlet 9a to the lower chamber B in the air circulating channel.

On the other hand, the air intake duct 10 is inserted to the second air vent 5c. The air intake duct 10 aspirates air from the lower chamber B and channels the air to the second air vent 5c. An air inlet 10a of the air exhaust duct 10 that opens in the lower chamber B is disposed at a lower level than the air outlet 9a. An upper end of the air exhaust duct 10 is inserted and connected to the second air vent 5c. The air intake duct 10 is only required to channel air to the second air vent 5c and the channeled air is only required to be channeled to the upper chamber A. Therefore, it is enough that the upper-end opening of the air intake duct 10 is connected to the second air vent 5c. Alternatively, the air intake duct 10 may be protruded to the upper chamber A or the air intake duct 10 may be connected to an air inlet of the power converter 7.

According to the offshore wind turbine of this embodiment having the above configuration, when the air exhaust fan 8 is operated, air that is heated in the power converter 7 is channeled by the air exhaust duct 9 and released to the lower chamber B. Heat of hot air H released to the lower chamber B is dissipated to seawater around the foundation 5 as indicated with an arrow T, and the hot air H is cooled. Through this heat dissipation colder air goes down to a lower level in the lower chamber B. The air going down to a lower level in the lower chamber B is aspirated from the air inlet 10a to the air intake duct 10 and rises through the air intake duct 10, and cold air C is released to the upper chamber A.

The cold air C released to the upper chamber A is aspirated into the power converter 7 by a suction power of the air exhaust fan 8 and cools the power converter 7. Air heated in the power converter 7 repeats the above circulation.

As described above, the power converter 7 can be closed water cooled with air circulating in the tower structure body 6 by channeling heat-absorbing air from the power converter 7 to the lower chamber B, heat-dissipating and cooling the air by heat exchange through the outer wall of the foundation 5 mainly with water outside of the lower chamber B, and circulating the heat-dissipated and cooled air in the power converter. Because of the closed water cooling system, salt, water and the like are prevented from entering to the inside of the wind turbine 1.

Second Embodiment

Next, a second embodiment of the present invention will be described with reference to FIG. 2.

In the above first embodiment, the air inlet 10a of the air intake duct 10 that opens in the lower chamber B is disposed at a lower level than the air inlet 9a to the lower chamber B, and cooled air in the lower chamber B is accordingly aspirated from the air inlet 10a. In an offshore wind turbine 20 of the second embodiment, on the other hand, similar operation and effect is obtained by providing a partition member 12 that separates between the air outlet 9a to the lower chamber B and an air inlet 11a from the lower chamber B.

Figure 2:
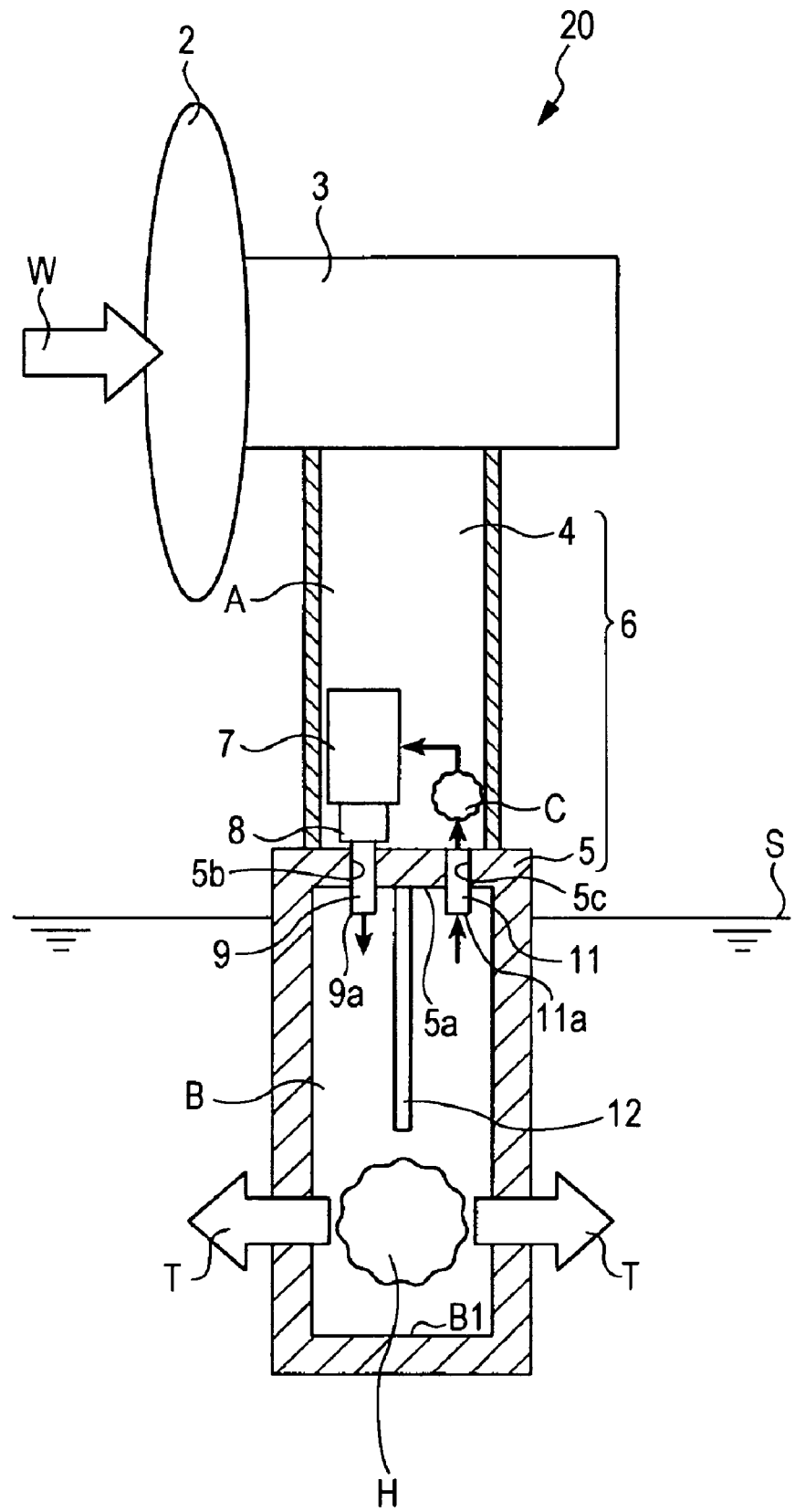
FIG. 2 is a partial schematic perspective side view of an offshore wind turbine according to a second embodiment of the present invention.

As shown in FIG. 2, unlike the air intake duct 10 of the first embodiment, an air intake duct 11 of this embodiment has a short lower end, and the air inlet 11a at the lower end of the air intake duct 11 is disposed on a same level with the air outlet 9a at the lower end of the air exhaust duct 9. The partition member 12 is disposed between the air outlet 9a and the air inlet 11a. An upper hem of the partition member 12 is bonded to a bulkhead 5a, and both side hems of the partition member 12 are bonded to an inner wall of the lower chamber B. A lower hem of the partition member 12 is separated from an inner bottom surface B1.

Accordingly, air flow from the air-outlet-9a side of the partition member 12 to the air-inlet-11a side thereof passes between the lower hem of the partition member 12 and the inner bottom surface B1 of the lower chamber B, and is bypassed to below the air outlet 9a and the air inlet 11a.

The air outlet 9a and the air inlet 11a are disposed on a same level in FIG. 2, but may be disposed at different levels. Another alternative may be that the air intake duct 10 is omitted and the second air vent 5c is retained so that the lower-end opening of the second air vent 5c to the lower chamber B functions as an air inlet from the lower chamber B. In any case, the lower chamber B is only required to be divided to the air-outlet-9a side and the air-inlet-11a side by the partition member 12 through to a lower level than the air outlet 9a and the air inlet 11a, which allows air flow to be bypassed to below the air outlet 9a and the air inlet 11a.

Since it is only required that air flow is bypassed to below the air outlet 9a and the air inlet 11a, an air vent may be provided at a position lower than the air outlet 9a and the air inlet 11a of the partition member on condition that the lower hem of the partition member is attached to the inner bottom surface B1 of the lower chamber B.

However, it is preferable that the bypassing is implemented through to a level as low as possible. Accordingly, a ventilation part (which is, in this embodiment, located between the lower hem of the partition member and the inner bottom surface B1) is disposed in a base space of the lower chamber. Except for the configuration described above, an offshore wind turbine 20 has the same configuration as the offshore wind turbine 1 and identical components are provided with identical reference numerals.

According to the offshore wind turbine of this embodiment having the above configuration, when the air exhaust fan 8 is operated, air that is heated in the power converter 7 is channeled by the air exhaust duct 9 and released to the lower chamber B. Hot air H released to the lower chamber B is bypassed to below a partition member 12, heat of the hot air H is dissipated to seawater around the foundation 5 as indicated with an arrow T, and the hot air H is cooled. Through this heat dissipation, colder air goes down to a lower level in the lower chamber B, at least to the level where the partition member 12 is located. With assistance of a suction power of the air inlet 11a, the air going down to a lower level than the partition member 12 rises through the below of the partition member 12, is aspirated from the air inlet 11a to the air intake duct 11, and rises in the air intake duct 11. Then cold air C is released to the upper chamber A.

The cold air C released to the upper chamber A is aspirated into the power converter 7 by a suction power of the air exhaust fan 8 and cools the power converter 7. Air heated in the power converter 7 repeats the above circulation. Also according to this embodiment, the power converter 7 can be closed water cooled with air circulating in the tower structure body 6 by channeling heat-absorbing air from the power converter 7 to the lower chamber B, heat-dissipating and cooling the air by heat exchange through the outer wall of the foundation 5 mainly with water outside of the lower chamber B, and circulating the heat-dissipated and cooled air in the power converter 7. Because of the closed water cooling system, salt, water and the like are prevented from entering to the inside of the wind turbine 20.

What is claimed is:

1. A floating offshore wind turbine comprising:
    a tower structure body that is configured with a tower and a foundation thereof;
    a rotor that is supported at the top of the tower;
    a power generator that generates electric power by the rotation of the rotor;
    a power converter that converts electric power output from the power generator;
        wherein a cavity is formed in the tower and the foundation;
        wherein an internal space configured with the cavity in the tower and the foundation is divided into an upper chamber and a lower chamber by a bulkhead between the tower and foundation or in the tower or foundation;
        wherein the power converter is disposed in the upper chamber; and
        wherein a first air vent and a second air vent are formed at the bulkhead; and
    an air circulating channel and an air blower wherein air is circulated from the power converter to the lower chamber through the first air vent, then from the lower chamber to the power converter through the second air vent.

2. The floating offshore wind turbine according to claim 1, wherein an air intake duct is provided to aspirate air from the lower chamber and channel the air to the second air vent, and an air inlet of the air intake duct that opens in the lower chamber is disposed at a lower level than an air outlet to the lower chamber in the air circulating channel.

3. The floating offshore wind turbine according to claim 1, wherein a partition member is provided in the lower chamber that separates between the air outlet to the lower chamber in the air circulating channel and the air inlet from the lower chamber and bypasses air flow from the air outlet to the air inlet to below the air outlet and inlet.

4. The floating offshore wind turbine according to claim 1, wherein a duct is provided that channels exhaust air from the power converter to the lower chamber through the first air vent.

\* \* \* \* \*